(12) United States Patent
Galligan et al.

(10) Patent No.: US 8,792,643 B1
(45) Date of Patent: Jul. 29, 2014

(54) SYSTEM AND METHODOLOGY FOR DECRYPTING ENCRYPTED MEDIA

(75) Inventors: Francis Galligan, Clifton Park, NY (US); Duncan MacLean, Kirkland, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/491,594

(22) Filed: Jun. 7, 2012

Related U.S. Application Data

(60) Provisional application No. 61/599,903, filed on Feb. 16, 2012.

(51) Int. Cl.
*H04L 9/00* (2006.01)

(52) U.S. Cl.
USPC .............. 380/262; 713/168; 713/189; 380/28

(58) Field of Classification Search
USPC ............................... 380/262, 28; 713/168, 189
See application file for complete search history.

(56) References Cited

U.S. PATENT DOCUMENTS

| | | | | |
|---|---|---|---|---|
| 7,149,901 B2 * | 12/2006 | Herbert et al. | ................. | 713/190 |
| 7,274,792 B2 * | 9/2007 | Chin et al. | ..................... | 380/262 |
| 7,369,662 B2 * | 5/2008 | Relander et al. | .............. | 380/261 |
| 7,602,908 B2 * | 10/2009 | Pare et al. | ........................ | 380/37 |
| 7,876,897 B2 * | 1/2011 | Yi | ..................................... | 380/44 |
| 2004/0247126 A1 * | 12/2004 | McClellan | ..................... | 380/262 |
| 2005/0195975 A1 * | 9/2005 | Kawakita | ........................ | 380/30 |
| 2010/0014669 A1 * | 1/2010 | Jiang | ............................. | 380/255 |
| 2010/0098254 A1 * | 4/2010 | Chowdhary et al. | .......... | 380/270 |
| 2013/0202111 A1 * | 8/2013 | El Gamal et al. | ............. | 380/270 |

OTHER PUBLICATIONS

"MediaSampleAttributeKeys Enumeration," http://msdn.microsoft.com/en-us/library/system.windows.media.mediasampleattributekeys%28v=vs.95%29.aspx, Last accessed May 30, 2012.

* cited by examiner

*Primary Examiner* — Amare F Tabor
(74) *Attorney, Agent, or Firm* — Amin, Turocy & Watson, LLP

(57) ABSTRACT

A system and method for decrypting encrypted media that have changing initialization vectors and keys is disclosed. As encrypted media is received and played back, the encrypted frames can be monitored (e.g., checked) to detect whether or not initialization vectors are prepended to them. If a prepended initialization vector is detected, the prepended initialization vector is used to facilitate the decryption of the encrypted frame. If no prepended initialization vector is detected, a new initialization vector is generated by using a last portion of bytes of the preceding encrypted frame and the new initialization vector is used to facilitate the decryption of the encrypted frame. A signal byte can be included to signal whether the frame is encrypted or not, whether an initialization vector is included, and other information about the encrypted frame.

20 Claims, 11 Drawing Sheets

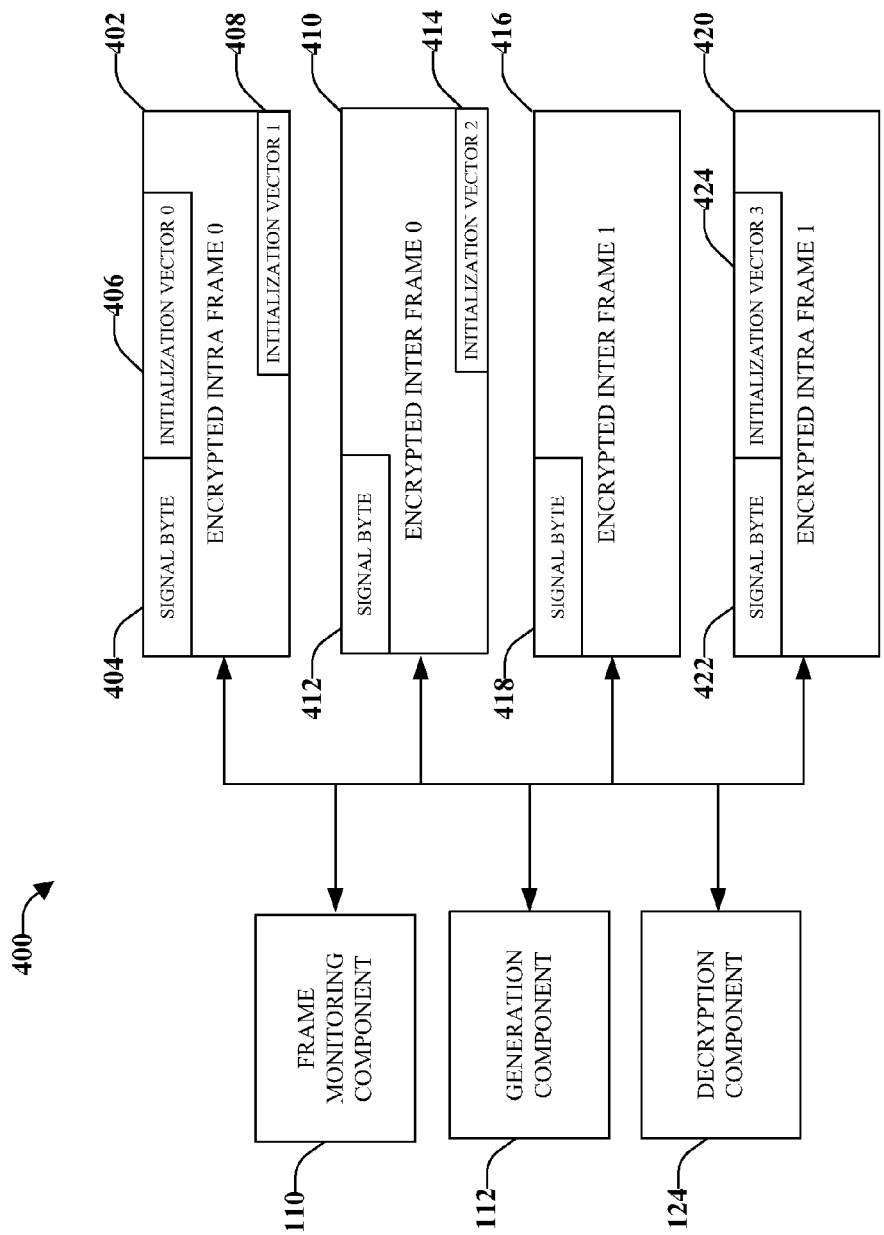

SYSTEM AND METHODOLOGY FOR DECRYPTING ENCRYPTED MEDIA

CROSS-REFERENCE TO RELATED APPLICATIONS

This application claims the benefit of U.S. Provisional Application No. 61/599,903, filed Feb. 16, 2012, and entitled "SYSTEM AND METHODOLOGY FOR DECRYPTING ENCRYPTED MEDIA", the entirety of which is incorporated herein by reference

TECHNICAL FIELD

This disclosure relates generally to encryption technology and specifically to decrypting encrypted media.

BACKGROUND

In conventional systems, the bits of an initialization vector for encrypted content are set to all 0s or some other constant number and do not change while playing back or streaming the media. Repeating the initialization vector while using the same key can allow attackers to infer relationships between segments of the encrypted data and possibly decrypt the data. Randomizing or pseudo-randomizing the initialization vector enables the encryption scheme to be semantically secure, making it difficult for the data to be illegitimately decrypted using only the cipher text.

In stream ciphers, the initialization vectors can be loaded into the key, after which a number of cipher rounds are executed prior to releasing the first bit of output. Reducing the number of rounds using the same initialization vector can increase security as entropy loss and initialization vector related attacks are a potential security issue for stream ciphers. Changing the initialization vector frequently therefore also can increase security.

Changing the initialization vector requires that the initialization vector change is signaled so that the media can be decrypted using the new initialization vector. Signaling and changing the initialization vector can add complexity to the media stack, which can interfere with smooth streaming and playback of media.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems and methods disclosed herein relate to decrypting encrypted data that has changing initialization vectors. Disclosed herein is a system including a frame monitoring component that monitors an encrypted frame to determine whether the encrypted frame has an initialization vector prepended to it or not. The system may also include a generation component that generates a new initialization vector by using a last portion of data of a previous encrypted frame if an initialization vector is not prepended to the frame. The system may also include a decryption component that uses the prepended initialization vector to decrypt the encrypted frame, if available, or uses the new initialization vector to decrypt the encrypted frame in response, if a prepended initialization vector is not available.

The frame monitoring component may also detect if a signal byte has been prepended to a frame. Bits in the signal byte can indicate that an additional signal byte follows the signal byte, that the frame is encrypted, that key data follows the signal byte, and/or that an initialization vector follows the signal byte. Processing the signal byte minimizes complexity in the media stack as the signal byte indicates information about the frames, while reducing the number of components in the media stack that have to know whether frames are encrypted or not (e.g. a demuxer component) and therefore can save processing time and bandwidth.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

BRIEF DESCRIPTION OF THE DRAWINGS

FIG. 4a-4b are block diagrams illustrating an example, non-limiting embodiment of a system for decrypting encrypted media data in accordance with various aspects and implementations described herein.

DETAILED DESCRIPTION

Overview

Figure 1:
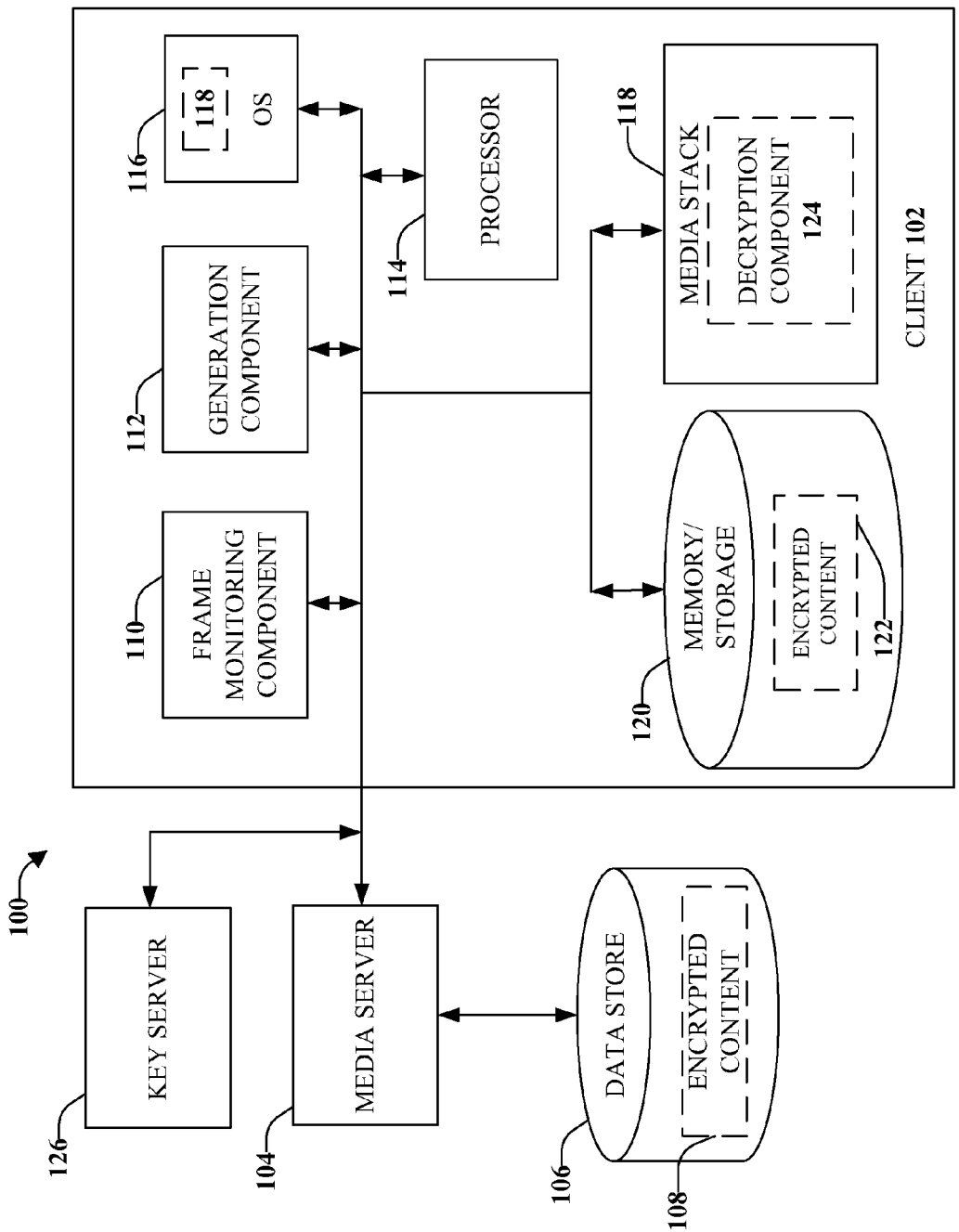
FIG. 1 is a block diagram illustrating an example, non-limiting embodiment of a system that can receive and present media data in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

FIG. 1 illustrates an example, non-limiting embodiment of a system 100 that can receive and present media data. The system 100 includes a client 102 which can represent a standalone media playback device. The client 102 includes a frame monitoring component 110, a generation component 112, a processor 114, an operating system 116, a media stack 118, and a memory/storage 120. The components 110, 112, 114, 116, 118, and 120 are communicably coupled to each other. The media stack 118 is configured to facilitate playback of media content. In one embodiment of the present disclosure, a decryption component 124 and the media stack 118 can be integrated into one software program. In another embodiment of the present disclosure, the frame monitoring component 110, generation component 112, decryption component 124, and the media stack 118 are integrated into a Web browser, which, in turn, communicates with a media server 104. In still another example of the present disclosure, the media stack 118 and decryption component 124 are a component of the client's operating system 116 or platform (e.g. hardware or firmware). In yet another example of the present disclosure, frame monitoring component 110, generation component 112, and decryption component 124 can all be part of the media stack 118.

In one embodiment of the present disclosure, the media server 104 is located externally to the client 102. The media server 104 is communicably coupled to the data store 106 that contains encrypted media content 108 that the media server 104 streams to the client 102. In one embodiment of the present disclosure, the media server 104 and the client 102 are located in the same device.

In one embodiment of the present disclosure, the encrypted media content 108 is stored in the memory/storage 120 of the client 102 (see 122), and subsequently processed (e.g. played back) by the frame monitoring component 110, the generation component 112, decryption component 124 and media stack 118. In this embodiment, the encrypted media content 122 can be uploaded to storage 120 by way of a user input device (e.g. compact disk drive) or can be downloaded to storage 120, e.g., via the media server 104. In one implementation, the frame monitoring component 110, the generation component 112, the decryption component 124, and the media stack 118 can process/playback the encrypted media content 122 offline (e.g. locally on the client 102 without a network connection to the media server 104). In another embodiment of the present disclosure, the encrypted media content 122 can be processed/played back in real time while it is being transmitted by the media server 104.

According to an aspect of the present disclosure, the frame monitoring component 110 is configured to monitor the encrypted content 122 (e.g. a part of a frame, a frame, or frames) and to differentiate between encrypted and unencrypted portions of the content. According to an aspect of the present disclosure, the frame monitoring component 110 detects when an initialization vector is prepended to an encrypted frame. The initialization vector is used in conjunction with a key to decrypt the encrypted frame to facilitate the media stack 118 processing the media for playback.

In some aspects of the present disclosure, if the frame monitoring component 110 determines that there is not an initialization vector prepended to the encrypted frame, the generation component 112 is configured to generate a new initialization vector to be used by the decryption component 124 in decrypting the encrypted frame. The generation component 112 can take the last portion of the encrypted frame preceding the current encrypted frame and use that portion as the new vector used by the key. In some aspects of the present disclosure, the generation component 112 can take the last portion of data of the preceding encrypted frame after it has been decrypted. The portion selected is equal in size to the initialization frame. If the preceding encrypted frame is smaller than the initialization vector size (i.e., there is not enough data in the encrypted frame to make an initialization vector), the last byte of the preceding frame is repeated until the portion selected equals the initialization vector size. This is explained further below with reference to FIG. 3.

In some embodiments of the present disclosure, the decryption component 124 is configured to use the prepended initialization vector that the frame monitoring component 110 detects to decrypt the current encrypted frame. In other embodiments of the present disclosure, when there is no prepended initialization vector, the generation component 112 generates a new initialization vector using the last portion of data from the preceding frame and the decryption component 124 uses the new initialization vector to decrypt the current encrypted frame. This is explained further below with reference to FIG. 3.

According to an aspect of the present disclosure, the decryption component 124 and the media stack 118 are communicably coupled to a key server 126 to obtain the key that is required to decrypt the encrypted content 108/122. It is to be appreciated that in some embodiments, the client 102 already possesses a key to decrypt particular encrypted media content 108 or 122, for example, in memory/storage 120. In that scenario, the media stack 118 or decryption component 124 typically does not try to obtain a key from key server 126. In other embodiments, the frame monitoring component 110 can monitor the encrypted content and determine that an encrypted frame or set of frames requires a new key. In that scenario, the media stack 118 or the decryption component 124 typically will try to obtain the key from the key server 126.

In the subject disclosure, the term media stack is used to refer to a component that is used to de-multiplex, decrypt, decode and/or render media content. It is to be appreciated that in some embodiments, the media stack 118 may not perform the de-multiplexing and/or rendering functions. Also, the terms key and license are used interchangeably in the subject disclosure. According to an aspect of the present disclosure, the frame monitoring component 110, generation component 112, decryption component 124 and/or the media stack 118 can be implemented in hardware, firmware or machine code. In an embodiment of the present disclosure, the media stack 118 is implemented in a network browser application (e.g. as a separate application program from the other components). In such an embodiment, the browser application itself can be referred herein to as a media stack 118.

Figure 2:
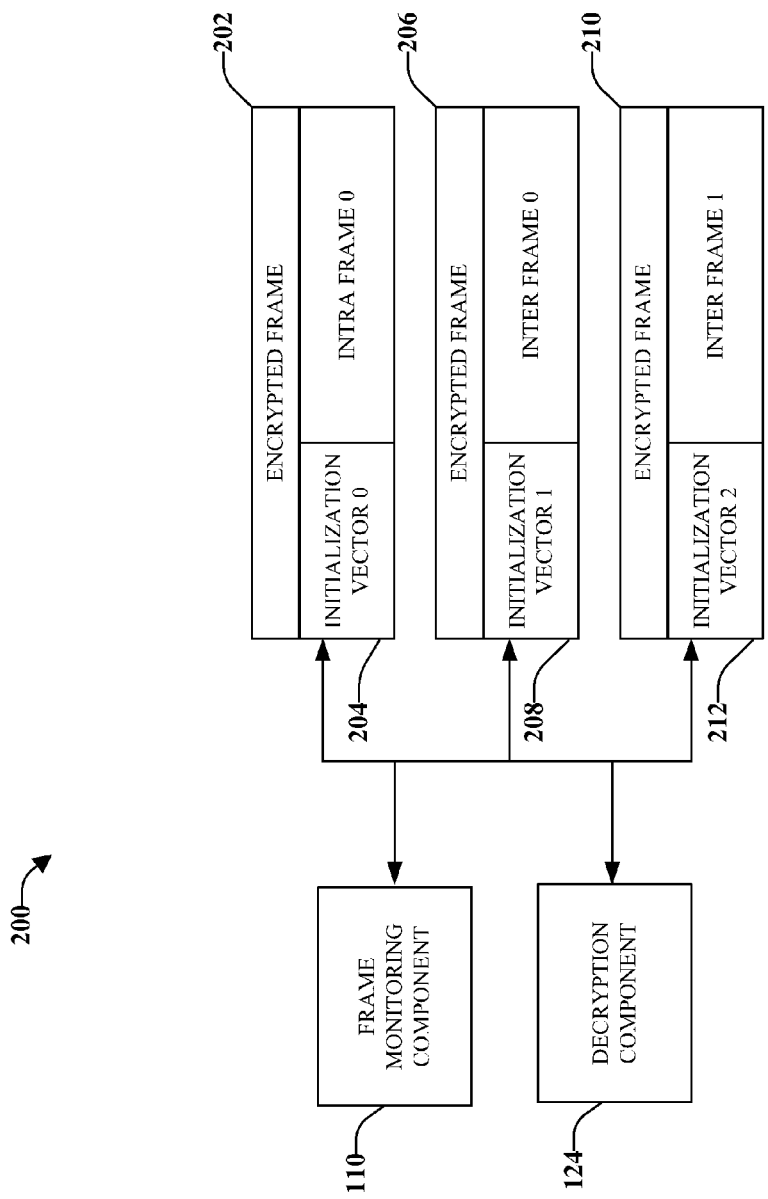
FIG. 2 is a block diagram illustrating an example, non-limiting embodiment of a system for decrypting encrypted media data in accordance with various aspects and implementation described herein.

FIG. 2 is a block diagram illustrating an example, non-limiting embodiment of a system 200 for decrypting encrypted media content 108 or 122 in accordance with various aspects and implementation described herein. Frame monitoring component 110 is provided to monitor encrypted frames 202, 206 and 210. Frame monitoring component 110 can detect initialization vectors 204, 208, and 212 that are prepended to encrypted frames 202, 206 and 210 respectively. Decryption component 124 can decrypt encrypted frames 202, 206, and 210 using the initialization vectors 204, 208, and 212, respectively.

It is to be appreciated that while FIG. 2 shows that encrypted frame 202 is an intra frame, and encrypted frames 206 and 210 as inter frames, any combination of types of frames and numbers of frames is possible. An intra frame is a frame upon which compression encoding techniques are performed relative to information that is contained within the frame itself. An inter frame is a frame that is expressed in terms of one or more neighboring frames. Inter frame prediction is employed to reduce the number of bytes used to represent a frame by predicting temporal redundancies between neighboring frames.

Changing the initialization vector of each frame can increase security by decreasing the probability that attackers will be able to infer relationships between ciphertexts and decrypted data that can potentially allow the encrypted data to be illegitimately decoded. Prepending the initialization vector to the encrypted frame signals to the media stack 118 that the initialization vector has changed, allowing the decryption component 124 to utilize the appropriate initialization vector for the encrypted frame.

Figure 3:
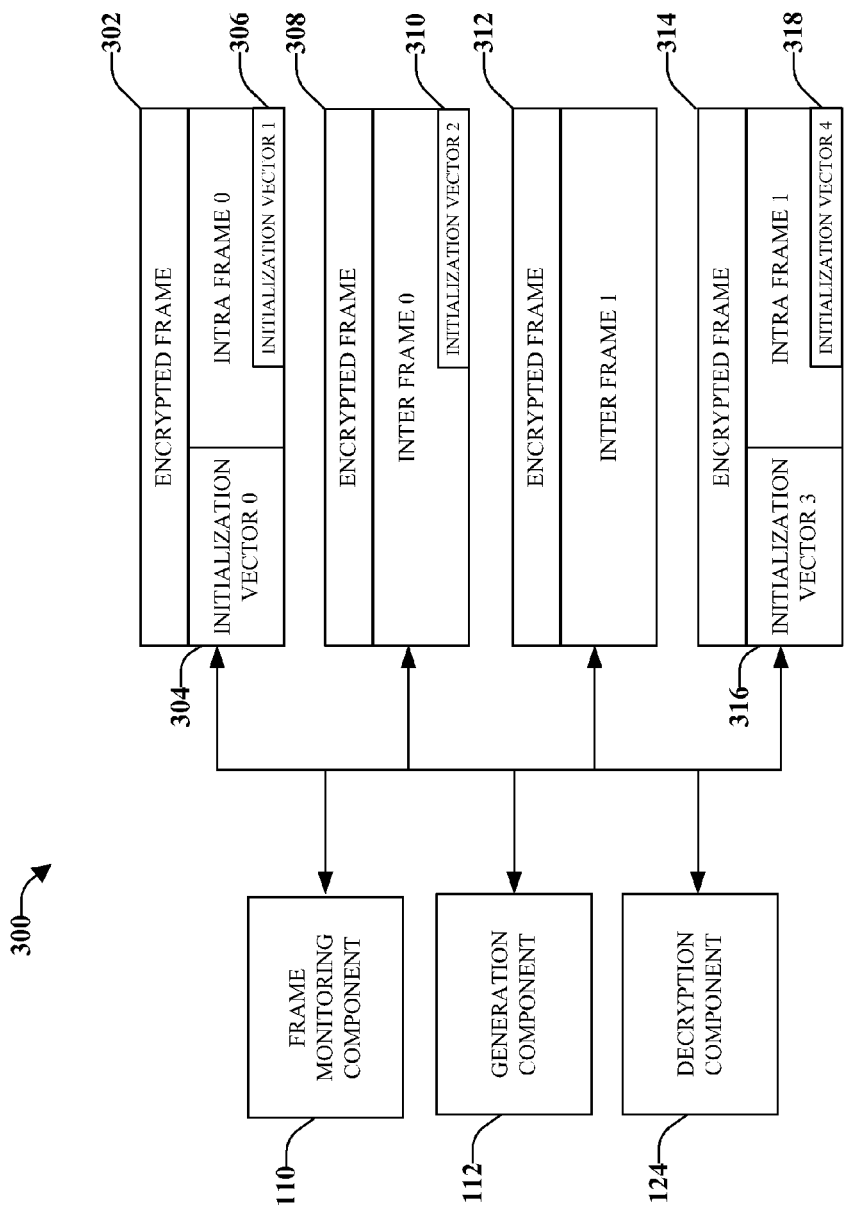
FIG. 3 is a block diagram illustrating an example, non-limiting embodiment of a system for decrypting encrypted media data in accordance with various aspects and implementations described herein.

Turning now to FIG. 3, an exemplary system 300 in which techniques of the present disclosure can be implemented is illustrated. In system 300, frame monitoring component 110 monitors encrypted frames 302, 308, 312, and 314. When monitoring encrypted frame 302, which happens to be an intra frame in FIG. 3, frame monitoring component 110 can determine that encrypted frame 302 has a prepended initialization vector 304. Decryption component 124 can then decrypt the encrypted frame 302 with the initialization vector 304.

Frame monitoring component 110 can then monitor encrypted frame 308 to determine if an initialization vector is prepended. When frame monitoring component 110 determines that encrypted frame 308 does not have a prepended initialization vector, generation component 112 is configured to use a last portion of frame 302 as an initialization vector for encrypted frame 308. In one implementation, generation component 112 is configured to use a last portion of frame 302 by copying the last portion of frame 302 to be used as the initialization vector for encrypted frame 308. For example, generation component 112 can copy the last portion of frame 302 to create initialization vector 306, which can then be used to facilitate the decryption of encrypted frame 308 by decryption component 124.

In some aspects of the present disclosure, the preceding encrypted frame can be smaller than the size of an initialization vector such that there is not enough data in the decrypted frame to make an initialization vector. For example, in some embodiments of the present disclosure, the initialization vector is sixteen bytes in length. In that case, if the preceding encrypted frame (e.g., Intra frame 0) is less than sixteen bytes, the last byte of the decrypted frame can be repeated until the initialization vector size is reached.

When frame monitoring component 110 determines that encrypted frame 312 does not have a prepended initialization vector, generation component 112 can repeat the previous process, in this instance retrieving/copying/creating initialization vector 310 from the last portion of frame 308. Initialization vector 310 can then facilitate the decryption of encrypted frame 312 by decryption component 124. Frame monitoring component 110 can determine that encrypted frame 314 has a prepended initialization vector 316 which can facilitate the decryption of encrypted frame 314 by decryption component 124. If a subsequent frame after encrypted frame 314 does not have a prepended initialization vector, a last portion 318 of data from encrypted frame 314 can be used as or to form the initialization vector for the subsequent encrypted frame.

In some aspects of the present disclosure, intra frames will have prepended initialization vectors and inter frames will use the last portion of data from the preceding frame as the inter frame's initialization vector. As playback of a media stream can begin on an intra frame, a prepended initialization vector facilitates the decryption of the intra frame, as there are no previous frames on which an intra frame typically depends from which to generate an initialization vector. In other embodiments of the disclosure, some inter frames as well as intra frames can have prepended initialization vectors.

Figure 4B:
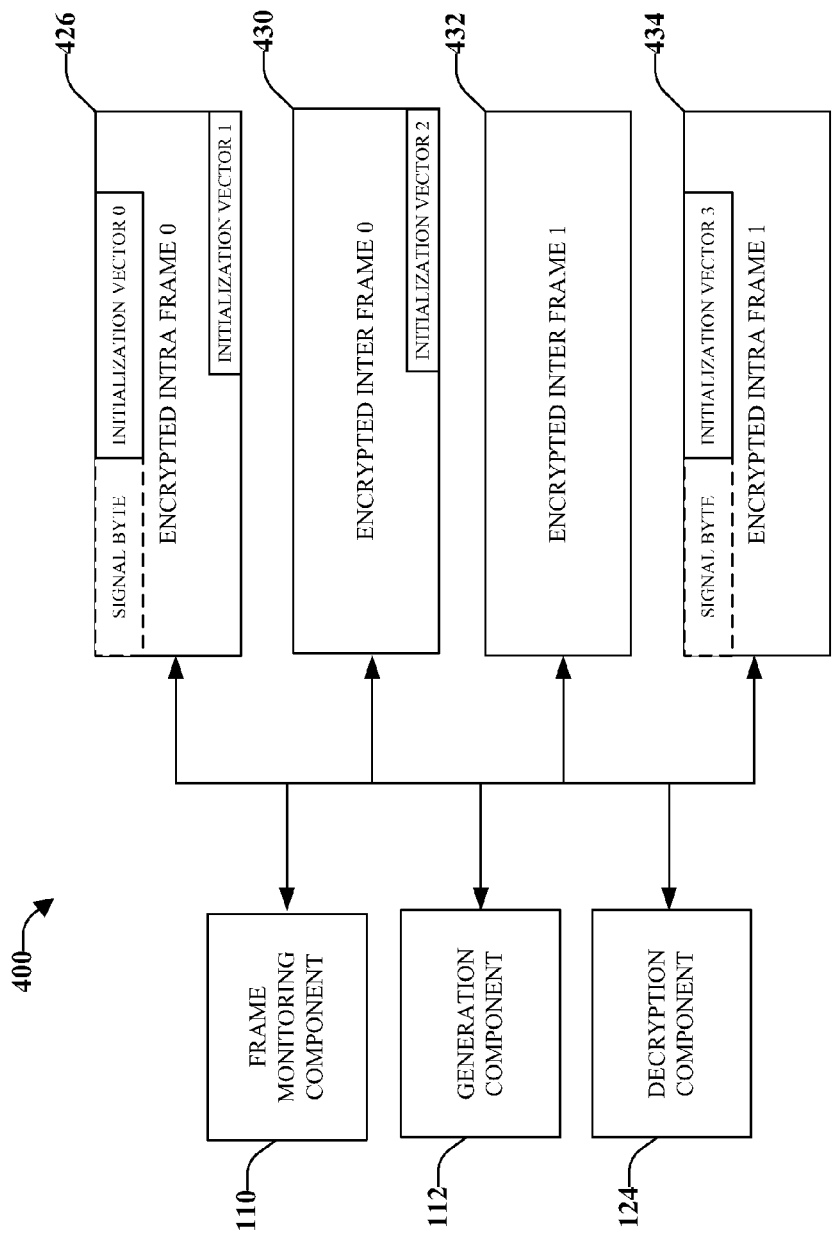

Turning now to FIGS. 4a and 4b, an exemplary system 400 for decrypting encrypted media data is shown. As in FIG. 3, the frame monitoring component 110 monitors encrypted frames 402, 410, 416, and 420, but in system 400, the frame monitoring component 110 is configured to detect whether a signal byte is prepended to the encrypted frames and if so, analyze the signal byte. In one implementation, the signal byte contain 8 bits, with some or all of the bits having defined roles. For instance, one bit of the signal byte can indicate that another signal byte prepended to an encrypted frame follows the initial signal byte. Another bit can indicate that the frame the signal byte is prepended is encrypted or not. Another bit can indicate that a key size byte and key data follows the signal byte. Another bit can indicate whether an initialization vector is prepended to the encrypted frame. These bits are referred to herein as the "extension bit", the "encrypted bit", the "key bit", and the "initialization vector bit" respectively. In some aspects of the present disclosure, some of the bits can be undefined.

Frame monitoring component 110 can analyze the signal byte 404 of encrypted frame 402 to determine the information that signal byte 404 is signaling based on which of the bits are activated. For instance, in one implementation, if a bit=1 the bit is activated and if the bit=0 the bit is not activated. In other implementations, if a bit=1 the bit is not activated and if the bit=0 the bit is activated. In FIG. 4a, signal byte 404 has the encrypted bit and the initialization vector bit activated, indicating that the frame 402 is encrypted, and that initialization vector 406 follows signal byte 404. Upon analyzing signal byte 402 by the frame monitoring component 110, decryption component 124 can decrypt encrypted frame 402 using initialization vector 406.

Next, frame monitoring component 110 can analyze signal byte 412 of encrypted frame 410 and determine that only the encryption bit is activated. This indicates to frame monitoring component 110 that the encrypted frame 410 is encrypted and also that there is no initialization vector prepended. In response, generation component 112 can generate an initialization vector 408 from the last portion of encrypted frame 402. Decryption component 124 can then decrypt encrypted frame 410 using initialization vector 408. When frame monitoring component 110 analyzes signal byte 418 which has the same bits activated as signal byte 412, the process can be repeated, and initialization vector 414 can be generated (e.g., retrieved, copied, or formed) from the last portion of encrypted frame 410 and used to decrypt encrypted frame 416.

Signal byte 422 of encrypted frame 420 has the encrypted bit and the initialization vector bit activated, alerting frame monitoring component 110 to the presence of initialization vector 424 following signal byte 422. Decryption component can then use initialization vector 424 to facilitate the decryption of encrypted frame 420.

FIG. 4b illustrates an example embodiment where frame monitoring component 110 determines that encrypted intra frames 426 and 434 have signal bytes and encrypted inter frames 430 and 432 have no signal bytes. Where encrypted frames have no signal bytes, frame monitoring component 110, generation component 112 and decryption component 124 can operate as in FIG. 3.

Figure 5:
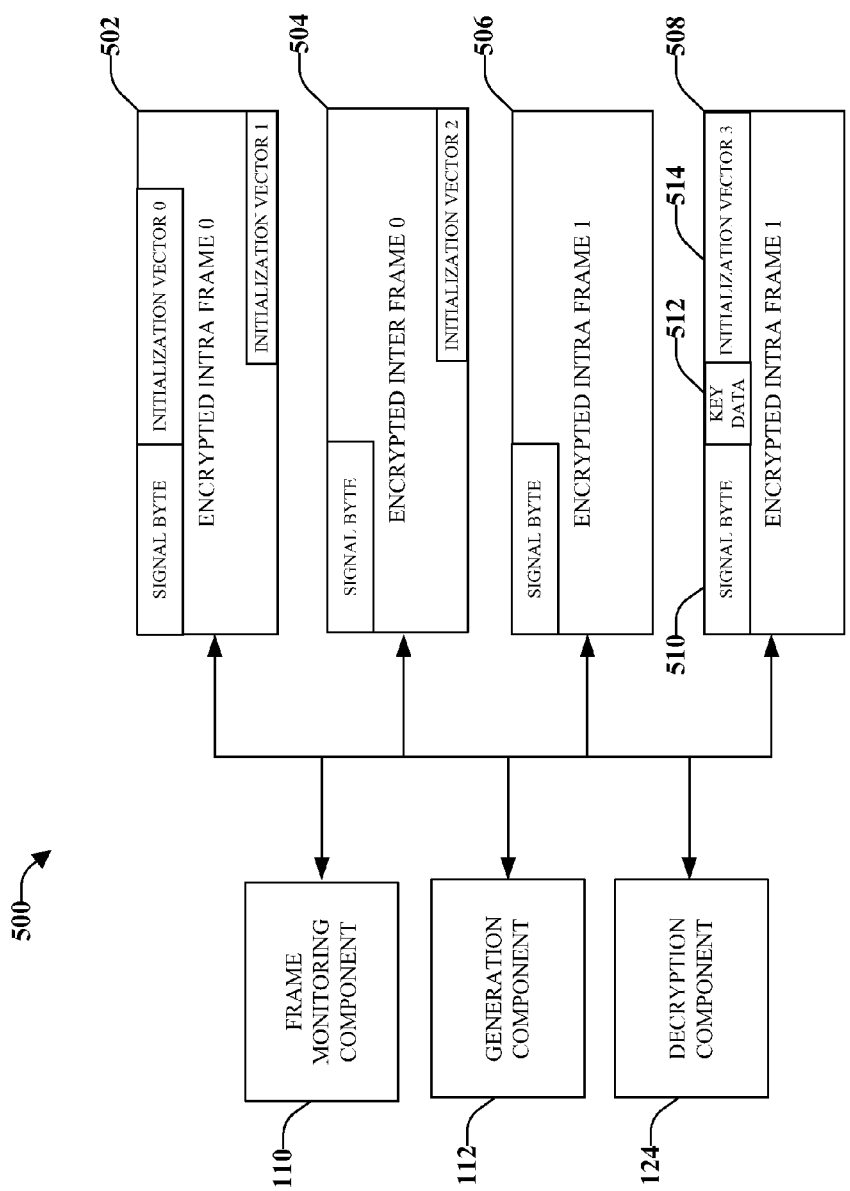
FIG. 5 is a block diagram illustrating an example, non-limiting embodiment of a system for decrypting encrypted media data in accordance with various aspects and implementations described herein.

FIG. 5 illustrates an exemplary embodiment of a system 500 in accordance with the present disclosure. Frame monitoring component 110 can detect the presence of and analyze signal bytes prepended to encrypted frames 502, 504, 506, and 508. In FIG. 5, the frame monitoring component 110, generation component 112 and decryption component 124 perform the same operations for encrypted frames 502, 504, and 506 as in FIG. 4 previously. Signal byte 510 can indicate to frame monitoring component 110 that key data and/or a key size byte is included after signal byte 510.

When the key bit of a signal byte (e.g., signal byte 510) is activated, that can indicate to the frame monitoring component 110 that a new key is needed to decrypt encrypted frame 508. In some aspects of the present disclosure, the key data block 512 can include the actual key. In other embodiments of the present disclosure, the key size and/or key data block 512 can be identifying information that client 102 can utilize to access a new key from a key server 126. Transmitting the key to the client 102 from key server 126 separate from the encrypted data can increase the security of the encrypted data. Once the new key is received, the decryption component 124 can use the initialization vector 514 and the new key to decrypt encrypted frame 508.

Figure 6:
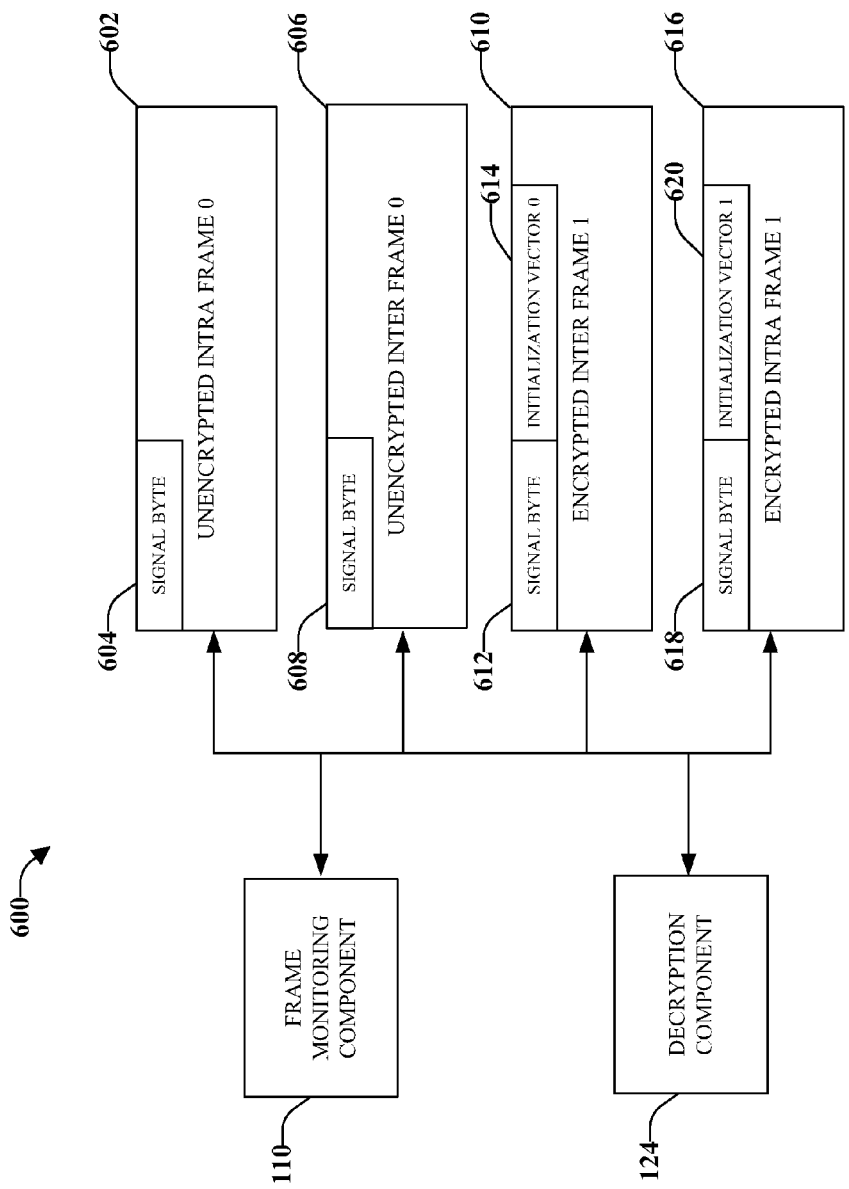
FIG. 6 is a block diagram illustrating an example, non-limiting embodiment of a system for decrypting encrypted media data in accordance with various aspects and implementations described herein.

Turning now to FIG. 6, an exemplary embodiment of a system 600 in accordance with the present disclosure is illustrated. In FIG. 6, frame monitoring component 110 can detect the presence of and analyze signal bytes prepended to frames 602, 606, 610, and 616. In some aspects of the present disclosure, one or more of the frames can be unencrypted. When this occurs, the signal byte prepended to the unencrypted frame can indicate that the frame is not encrypted. For example, when frame monitoring component 110 analyzes signal bytes 604 and 608 of frames 602 and 606, frame monitoring component 110 can determine that the encrypted bit of signal bytes 604 and 608 are not activated, and so decryption component 124 will not attempt to decrypt those frames before the media stack 118 processes them. Additionally, frame monitoring component 110 will not monitor for initialization vectors when it receives information that the frames are not encrypted. Alternatively, if frame monitoring component 110 receives information that the frames are encrypted, it will monitor the signal bytes to detect initialization vectors.

Signal bytes 612 and 618 have activated encrypted bits and initialization vector bits, indicating that initialization vectors 614 and 620 follow signal bytes 612 and 618, respectively. Decryption component 124 can use initialization vectors 614 and 620 to decrypt encrypted frames 610 and 616.

Figure 7:
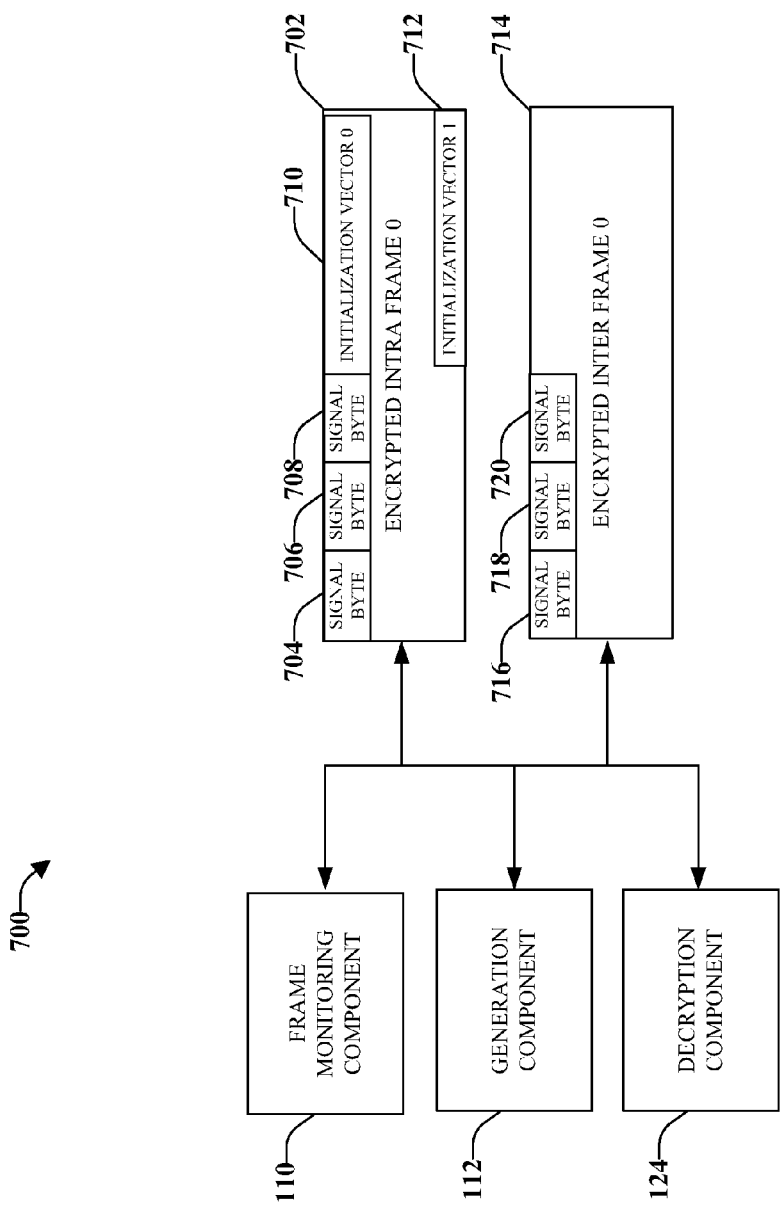
FIG. 7 is a block diagram illustrating an example, non-limiting embodiment of a system for decrypting encrypted media data in accordance with various aspects and implementations described herein.

Turning now to FIG. 7, an exemplary embodiment of a system 700 in accordance with the present disclosure is illustrated. In FIG. 7, frame monitoring component 110 can detect the presence of and analyze signal bytes prepended to encrypted frames 702 and 714. When frame monitoring component analyzes signal byte 704 of encrypted frame 702, it can determine that the extension bit, encrypted bit, and initialization vector bit are activated, indicating that there is an additional signal byte 706 following signal byte 704, and there is also an initialization vector prepended to the encrypted frame following the signal bytes. Signal byte 706 can also have an extension bit activated indicating that signal byte 708 is present. Additional signal bytes can be used for future expansion of capabilities and signaling. Decryption component 124 can then decrypt encrypted frame 702 using initialization vector 710 that follows signal byte 708.

Frame monitoring component 110 can also analyze signal bytes 716, 718, and 720 in turn, none of which indicate the presence of an initialization vector. Generation component 112 can then generate (e.g., retrieve, copy or form) initialization vector 712 from the last portion of data from encrypted frame 702. Decryption component 124 can decrypt encrypted frame 714 using initialization vector 712.

Figure 8:
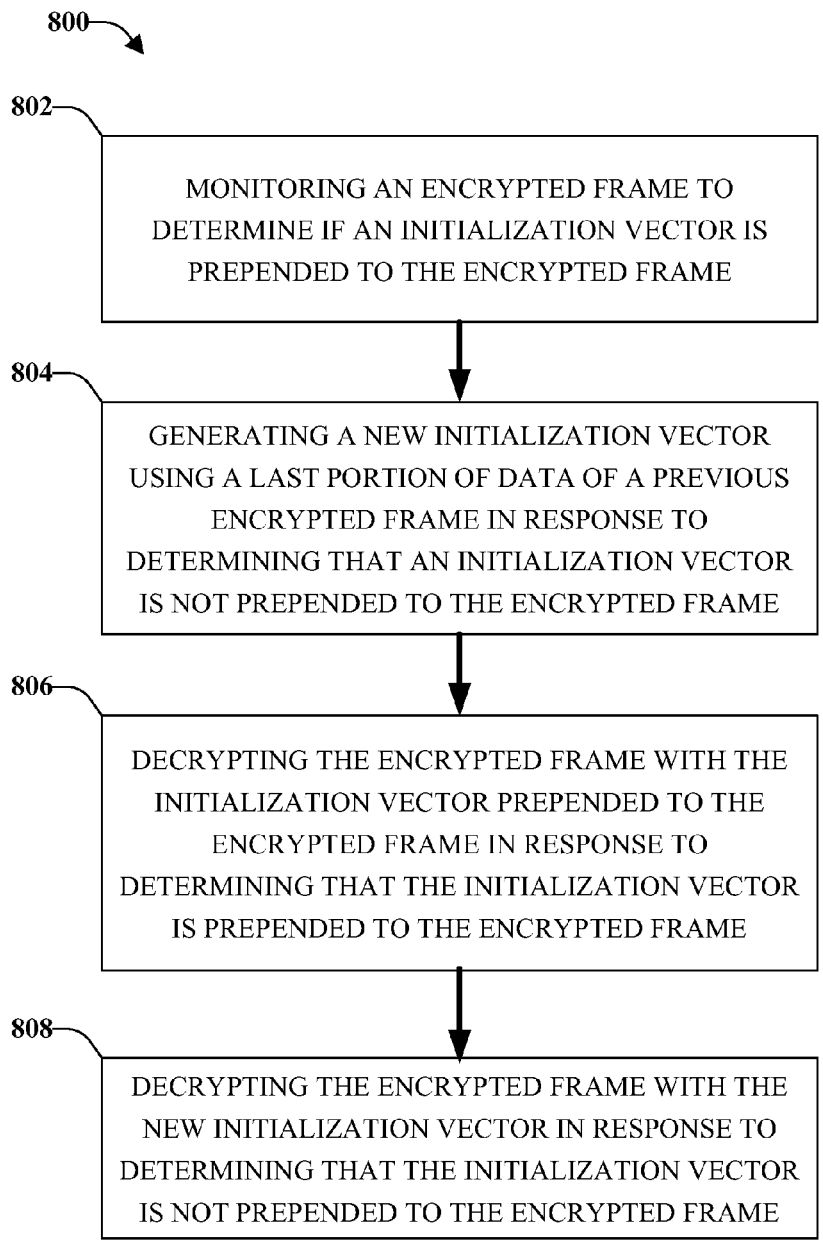
FIG. 8 is an exemplary flow diagram to illustrate a methodology in accordance with various aspects and implementations described herein.

FIG. 8 illustrates an exemplary flow diagram 800 for a methodology according to an aspect of the present disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the method in accordance with the disclosed subject matter. In addition, those skilled in the art will understand and appreciate that the method could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable as methods and/or in accordance with the following depicted method.

At 802, a frame monitoring component (e.g. 110) monitors (e.g., checks) an encrypted frame to detect whether the encrypted frame has an initialization vector prepended to the encrypted frame. At 804, a generation component (e.g. 112) generates a new initialization vector from a last portion of data of a previous frame in response to not detecting the prepended initialization vector. In some aspects of the present disclosure, the last portion of data can be decrypted before being retrieved or copied to create a new initialization vector. In one embodiment, if the previous encrypted frame is smaller than the initialization vector size, a last byte (or a number of last bytes) of the previous frame can be copied until the size of the initialization vector is reached.

At 806, a decryption component (e.g. 124) can decrypt the encrypted frame with the initialization vector that was prepended to the encrypted frame in response to detecting the initialization vector. At 808, a decryption component (e.g. 124) can decrypt the encrypted frame with the new initialization vector that was created by the generation component at 804.

Exemplary Computing Device

Figure 9:
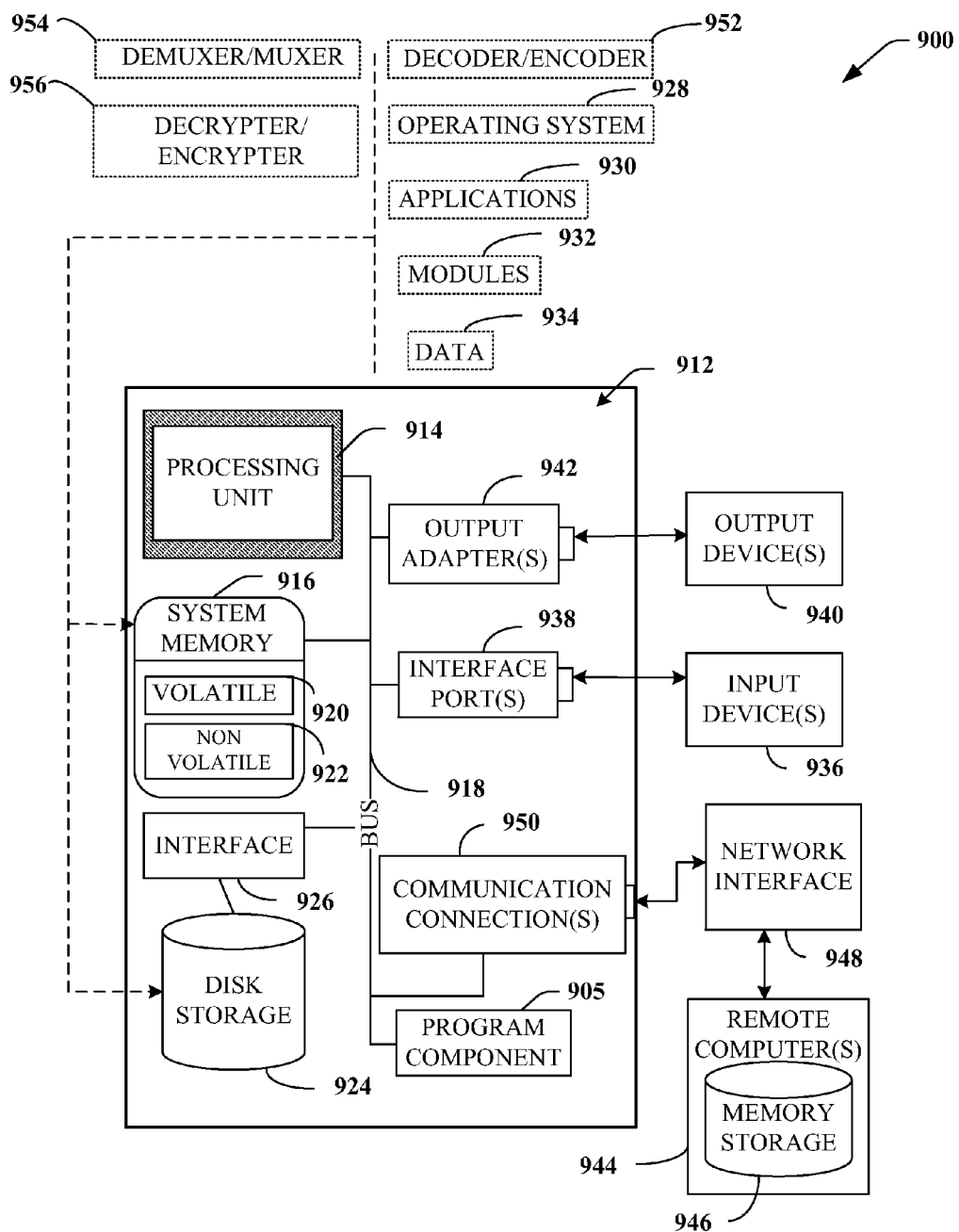
FIG. 9 is a block diagram illustrating an example computing device that is arranged in accordance with various aspects and implementations described herein.

With reference to FIG. 9, a suitable environment 900 for implementing various aspects of this disclosure includes a computing device 912. The computing device 912 includes a processing unit(s) 914, a system memory 916, and a system bus 918. The system bus 918 couples system components including, but not limited to, the system memory 916 to the processing unit 914. The processing unit(s) 914 can be any of various available processors. Dual microprocessors and other multiprocessor architectures also can be employed as the processing unit(s) 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 994), and Small Computer Systems Interface (SCSI).

The system memory 916 includes volatile memory 920 and nonvolatile memory 922. The basic input/output system (BIOS), containing the basic routines to transfer information between elements within the computing device 912, such as during start-up, is stored in nonvolatile memory 922. By way of illustration, and not limitation, nonvolatile memory (e.g., 922) can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory (e.g., 920) includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM. Additionally, the disclosed memory components of systems or methods herein are intended to include, without being limited to including, these and any other suitable types of memory.

Computing device 912 can also include removable/non-removable, volatile/non-volatile computer storage media. FIG. 9 illustrates, for example, a disk storage 924. Disk storage 924 includes, but is not limited to, devices like a magnetic disk drive, flash drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

FIG. 9 also depicts software that acts as an intermediary between users and the basic computer resources described in the suitable operating environment 900. Such software includes, for example, an operating system 928. Operating system 928, which can be stored on disk storage 924, acts to control and allocate resources of the computing device 912.

System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems.

A user enters commands or information into the computing device 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computing device 912, and to output information from computing device 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computing device 912 can also include a decrypter/encrypter 956, a demuxer/muxer 954, and a decoder/encoder 952. In some embodiments of the present disclosure, the demuxer 954 separates media content received from a media server into its pre-multiplexed components and forwards it to the decrypter 956. The decrypter 956 provides the decrypted content (or, in some embodiments, original content in case the original content was not encrypted) to the decoder 952. The decoder 952 decodes the media content and in some embodiments forwards it to output adapter 942 for rendering.

Computing device 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computing device 912. For purposes of brevity, only a memory storage device 946 is illustrated with remote computer(s) 944. Remote computer(s) 944 is logically connected to computing device 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computing device 912, it can also be external to computing device 912. The hardware/software necessary for connection to the network interface 948 includes, for exemplary purposes only, internal and external technologies such as, modems including regular telephone grade modems, cable modems and DSL modems, ISDN adapters, Ethernet cards, and wireless networking cards.

In accordance with various aspects and implementations, the computing device 912 can be used to identify initialization vectors prepended to encrypted frames and generate new initialization vectors for frames without prepended initialization vectors and decrypt the encrypted frames with the initialization vectors. As more fully disclosed herein, in some implementations, the computing device 912 can include one or more processors (e.g., processing units 114, 914) that can be used to process data, including processing data to perform various tasks (e.g., monitoring encrypted frames, detecting prepended initialization vectors, generating new initialization vectors, decrypting the encrypted frames, etc.). The computing device 912 can include a program component 905 that can be associated with (e.g., communicatively connected to) the one or more processors. The program component 905 can contain, for example, a frame monitoring component, a generation component, a decryption component and/or other components, which can respectively function as more fully disclosed herein, to facilitate decrypting encrypted media content with changing initialization vectors.

Exemplary Networked and Distributed Environments

Figure 10:
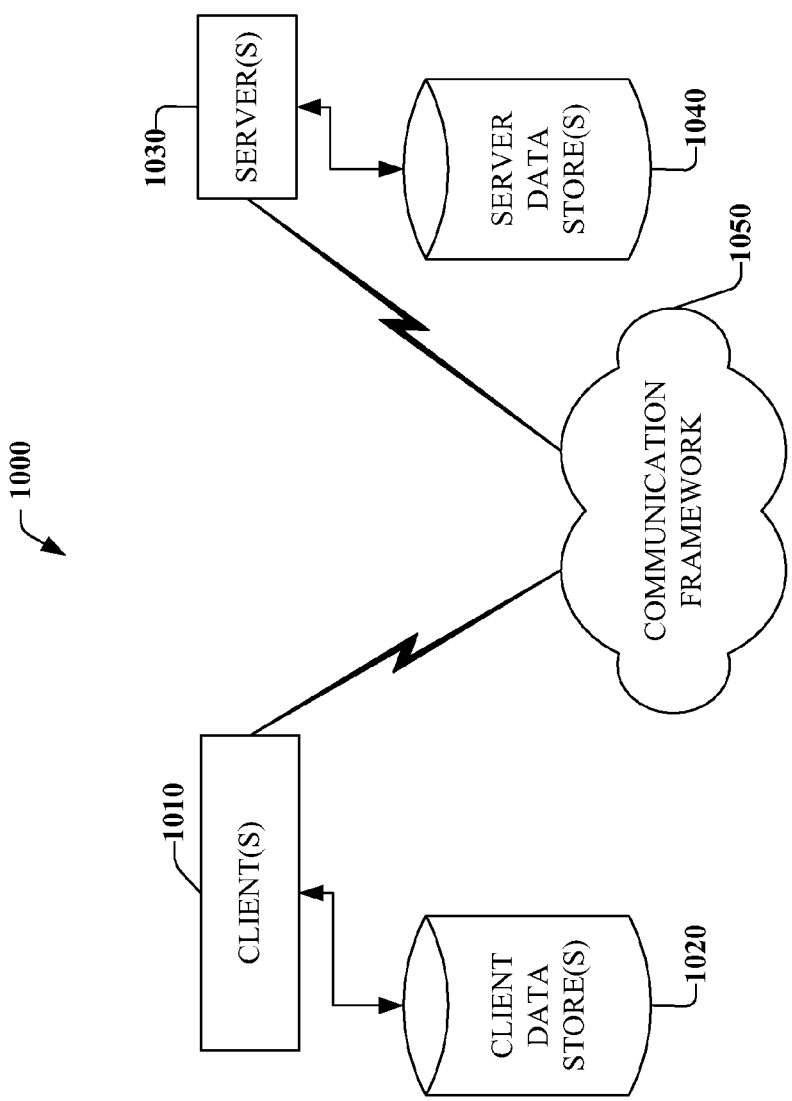
FIG. 10 is a block diagram illustrating an example networking environment in accordance with various aspects and implementations of this disclosure.

FIG. 10 is a schematic block diagram of a sample-computing environment 1000 in accordance with implementations of this disclosure. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be appreciated and understood that components, as described with regard to a particular system or method, can include the same or similar functionality as respective components (e.g., respectively named components or similarly named components) as described with regard to other systems or methods disclosed herein.

It is to be noted that aspects or features of this disclosure can be used with substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be used with legacy telecommunication technologies, e.g., GSM. In addition, mobile as well non-mobile networks (e.g., the Internet, data service network such as internet protocol television (IPTV), etc.) can be used with aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Reference throughout this specification to "one implementation," or "an implementation," or "one embodiment," or "an embodiment" means that a particular feature, structure, or characteristic described in connection with the implementation or embodiment is included in at least one implementation or one embodiment. Thus, the appearances of the phrase "in one implementation," or "in an implementation," or "in one embodiment," or "in an embodiment" in various places throughout this specification can, but are not necessarily, referring to the same implementation or embodiment, depending on the circumstances. Furthermore, the particular features, structures, or characteristics may be combined in any suitable manner in one or more implementations or embodiments.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

What has been described above includes examples of systems and methods of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system comprising:
    a memory that has stored thereon computer executable components; and
    a processor that executes the following computer executable components stored in the memory:
        a frame monitoring component that monitors an encrypted frame to determine if an initialization vector is prepended to the encrypted frame;
        a generation component that generates a new initialization vector by using a continuous portion of decrypted stream data immediately preceding the encrypted frame at the end of a preceding encrypted frame in response to the frame monitoring component determining that an initialization vector is not prepended to the encrypted frame; and
        a decryption component that uses the new initialization vector to decrypt the encrypted frame in response to the frame monitoring component determining that the initialization vector is not prepended to the encrypted frame.

2. The system of claim 1, wherein size of the new initialization vector is sixteen bytes.

3. The system of claim 1, wherein the generation component appends a last byte of the preceding encrypted frame one or more times to an end of the portion of data to form the new initialization vector having the predetermined size.

4. The system of claim 1, wherein the portion of data is a size of the previous frame and, if the size of the preceding encrypted frame is smaller than the predetermined size, the generation component appends a last byte of the preceding encrypted frame one or more times to an end of the portion of data to form the new initialization vector having the predetermined size.

5. The system of claim 1, wherein the frame monitoring component detects that a signal byte has been prepended to the encrypted frame.

6. The system of claim 5, wherein bits in the signal byte indicate that an additional signal byte follows the signal byte, that the frame is encrypted, that key data follows the signal byte, and that an initialization vector follows the signal byte.

7. The system of claim 6, wherein the key data is used to obtain a new key from a key server.

8. The system of claim 1, wherein the frame monitoring component determines if the encrypted frame is an intra frame or an inter frame.

9. The system of claim 8, wherein the frame monitoring component determines that the initialization vector is prepended to the encrypted frame in response to determining that the encrypted frame is an intra frame.

10. The system of claim 8, wherein the generation component generates the new initialization vector from the portion of data from the previous encrypted frame in response to the frame monitoring component determining that the encrypted frame is an inter frame.

11. The system of claim 1, wherein the frame monitoring component monitors signal bytes of a series of frames to detect an initialization vector in response to receiving information that one of the series of frames is encrypted.

12. A method comprising:
  employing a processor that facilitates execution of computer executable instructions stored on a non-transitory computer readable medium to implement operations, comprising:
    monitoring an encrypted frame to determine if an initialization vector is prepended to the encrypted frame;
    generating a new initialization vector by using a continuous portion of decrypted stream data at an end of an immediately preceding encrypted frame in response to determining that the initialization vector is not prepended to the encrypted frame; and
    decrypting the encrypted frame with the new initialization vector.

13. The method of claim 12, further comprising: copying a last byte of the previous frame to an end of the new initialization vector to cause the new initialization vector to match a predetermined size of the initialization vector.

14. The method of claim 12, further comprising: decrypting the preceding encrypted frame before copying the portion of data at the end of the frame.

15. The method of claim 12, further comprising: detecting that a signal byte has been prepended to a frame, and analyzing the signal byte to identify data that is prepended to the encrypted frame.

16. The method of claim 15, further comprising: obtaining a key from a key server using key data in response to identifying that key data is prepended to the signal byte.

17. The method of claim 12, further comprising: determining whether the encrypted frame is an intra frame or an inter frame.

18. The method of claim 17, further comprising: monitoring for the initialization vector prepended to the encrypted frame in response to determining that the encrypted frame is an intra frame.

19. The method of claim 17, wherein the generating the new initialization vector is in response to determining that the encrypted frame is an inter frame.

20. A non-transitory computer readable storage medium comprising computer-executable instructions, that in response to execution, cause a computing system to perform operations, comprising:
  monitoring an encrypted frame to determine if an initialization vector is prepended to the encrypted frame;
  generating a new initialization vector by using a continuous portion of decrypted stream data at an end of an immediately preceding encrypted frame in response to determining that the initialization vector is not prepended to the encrypted frame; and
  decrypting the encrypted frame with the new initialization vector.

* * * * *